United States Patent [19]
Sable

[11] 3,744,899
[45] July 10, 1973

[54] METHOD OF PREPARING DOCUMENTS

[75] Inventor: Arthur J. Sable, Riverside, Conn.

[73] Assignee: International Business Machines Corporation, Armonk, N.Y.

[22] Filed: June 11, 1970

[21] Appl. No.: 57,376

Related U.S. Application Data

[62] Division of Ser. No. 758,158, Sept. 6, 1068, Pat. No. 3,576,367.

[52] U.S. Cl. .......... 355/14, 355/13, 355/41, 355/42

[51] Int. Cl. .......... G03b 27/52, G03g 5/00

[58] Field of Search .......... 355/42, 41, 40, 6, 355/13, 14

[56] References Cited

UNITED STATES PATENTS

| | | | |
|---|---|---|---|
| 3,259,037 | 7/1966 | Wilkinson | 355/40 X |
| 3,267,800 | 8/1966 | Baillod | 355/42 X |
| 3,472,136 | 10/1969 | Hemphill | 355/40 X |

*Primary Examiner*—Samuel S. Matthews
*Assistant Examiner*—Michael Harris
*Attorney*—Hanifin and Clark and Robert E. Sandt

[57] ABSTRACT

A method of printing variable data in which a succession of documents are prepared by first printing the variable data along with control symbols manifestive of the document format of fixed data, and then reading the symbols to select the appropriate background data instrumentality and overprinting the appropriate forms background over the variable data in a second step employing the selected background data instrumentality, preferably by means of xerographic electrophotography.

3 Claims, 6 Drawing Figures

PATENTED JUL 10 1973 3,744,899

SHEET 1 OF 4

METHOD OF PREPARING DOCUMENTS

This is a division of U.S. Pat. application Ser. No. 758,158 filed Sept. 6, 1968, now U.S. Pat. No. 3,576,367.

This invention relates to a method of and apparatus for preparing documents, and more particularly to a method of and apparatus for printing variable data constituting a succession of documents together with control symbols manifestive of the document format in a first printing machine and overprinting the appropriate forms background over the variable data in a second machine under control of the preprinted control symbols.

It is well known to load a record-controlled printing machine with preprinted forms and to contrl the printer to print the variable data in the appropriate areas of the preprinted forms to produce a succession of business instruments, or other documents. While this mode of operation is eminently successful, it necessitates that all of the source records requiring the same form be collected in a single batch and serially processed through the printer. The forms stationery appropriate to the next batch of records is then loaded into the printer and the records compatible with that format processed. If only a few records requiring a given document format are available for processing, their processing must either be deferred until a sufficient quantity is available to justify loading the printer with requisite stationery, or the printer must be operated very inefficiently with frequent stationery changes. This results in a very substantial diminution in the production rate of the printer. With modern high speed computer-controlled printers, this penalty in speed is prohibitive. As a consequence, the records are invariably "batched processed" by presorting, and low volume records are often printed on blank stationery with only the minimal format printing which can be printed by the record-controlled printer itself. This format printing is necessarily limited to alphanumeric characters and special symbols, and, in addition to limiting the variety of form backgrounds, it also slows the total output of the printer by requiring it to print the additional form information, which is, in fact, common to many documents.

When modern electronic data processing equipment is time-shared by a variety of customers or by a variety of applications of the same user, the need for a readily available stock of stationery forms becomes critical. The instant invention provides this very necessary function by always printing the variable data constituting the successive document entries in predetermined relatively spaced areas on blank stationery under control of the data and the program of a computer connected to the record controlled printer. The printer, under computer control, also prints control symbols in assigned spaces of each successive document. The documents thus prepared, and without any form background then receive an overprint of the appropriate respective form background, which is selected and registered with the variable data under control of the special control symbols printed by the record-controlled printer. The overprinting of the form background is preferably achieved by sensing the control symbols to index a film projector containing a library of stored form backgrounds to the requisite image, projecting that image to the surface of an electrophotographic printer in registry with the movement of the corresponding document therethrough. The document thus receives an overprint of the requisite form background which may now include diagrams or any other desirable form of artwork.

In accordance with the foregoing summary of the invention it is an object of this invention to provide a document originating machine having a record-controlled printer adapted to print the variable information constituting the data entries of a succession of documents in predetermined spaces on a blank record form together with coded control symbols manifestive of each successive document form, and a forms background printing machine operable under control of the coded control symbols to select and overprint upon each successive document the forms background appropriate to each of the respective documents.

Another object of this invention is to provide an improved method of preparing a succession of documents, each containing a different form background printing and variable data content by first printing the variable data together with control symbols manifestive of the format of each successive document, and overprinting the forms background compatible with each respective document under control of the preprinted symbols.

A further object of the invention is to provide an electrophotographic printer having an addressable store of form background photographic images, means operable responsive to coded control symbols preprinted, together with variable data, or otherwise blank stationery constituting a succession of documents for selecting the photographic image corresponding to each respective successive document, and means operable to feed the preprinted stationery through the electrographic printer in synchronism with the exposure of the electrophotographic printing medium to the selected image to thus overprint the respective selected form backgrounds on each document preprinted on the stationery.

Yet another object is to provide a document originating machine having a mutable printing device adapted to print upon a blank record form variable data constituting a succession of documents together with a set of coded control symbols individual to each document, means for feeding the succession of documents to a forms printer adapted under control of the preprinted control symbols to select, register, and print a form background compatible with each successive document, and means coordinating the operation of the two printers to intercept the operation of the faster operating one of the two machines.

Another, and more specific, object of the invention is to provide a document originating machine in accordance with the foregoing object wherein the means coordinating the operation of the two machines includes means for forming a loop in the stationery web between the variable data printer, and the forms printer means for sensing the length of the loop, means for stopping the variable printer when the loop exceeds a predetermined maximum length, and means for stopping the forms printer when the loop exceeds a predetermined minimum length.

Yet another specific object is to provide means in the electrophotographic printer, operable under control of the coded control marks on the preprinted stationery for severing the web into individual documents, whereby the severed documents may continue their feed uninterceptedly through the forms printer when the web feed is intercepted.

A further specific object of the invention is to provide means in a continuously operating electrophotographic printer having intermittent stationery feed operable responsive to the absence of copy stationery therein for inhibiting the deposition of ink upon the electrophotographic printing member for the duration of the lack of stationery.

The foregoing and other objects, features and advantages of the invention will be apparent from the following more particular description of a preferred embodiment of the invention, as illustrated in the accompanying drawings.

Figure 1:
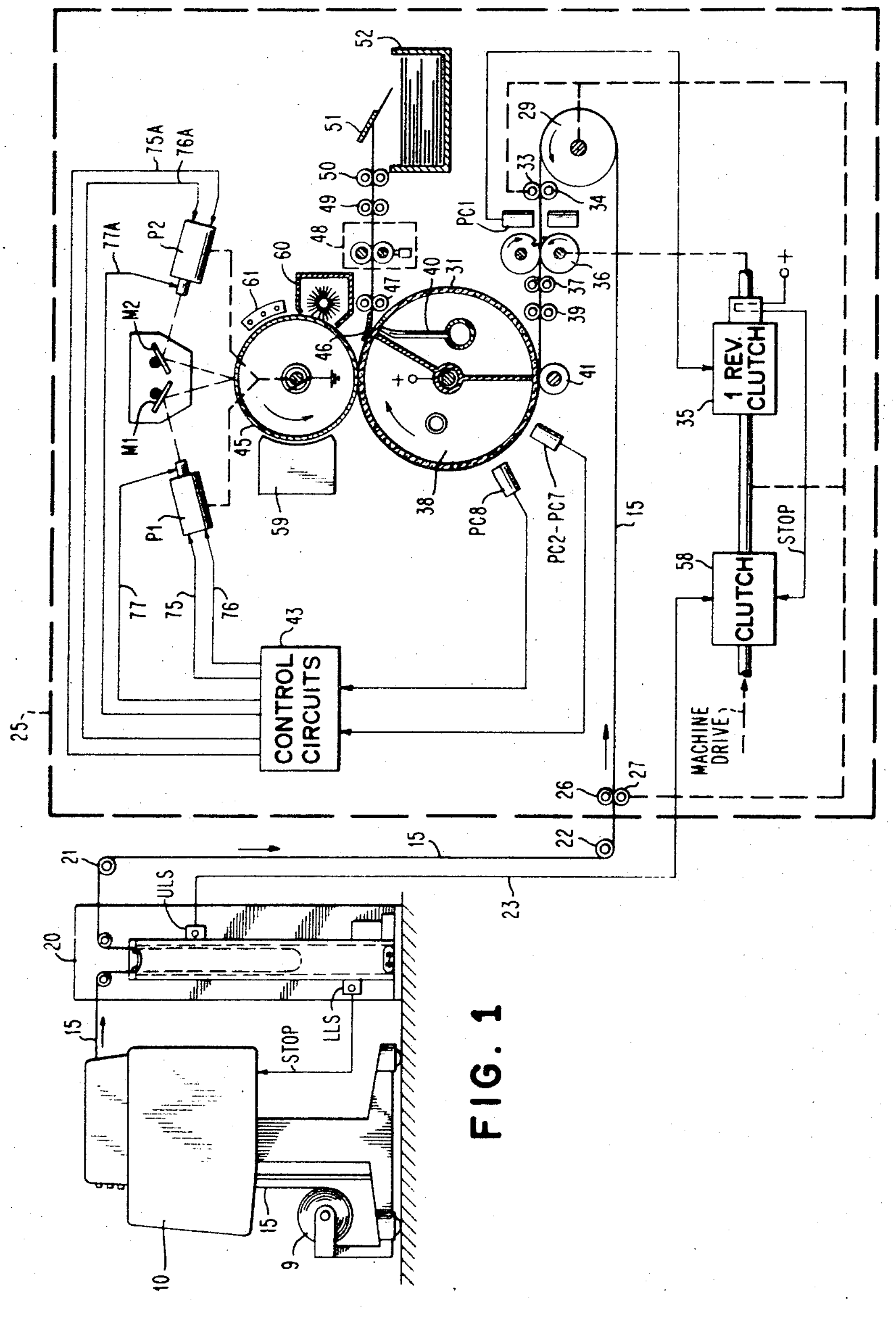
FIG. 1 is a schematic diagram (not to scale) of the overall mechanical arrangement of the invention.

The basic operation of the document originating machine is illustrated schematically in FIG. 1 wherein 10 represents a standard commercially available computer-controlled printer such as that partially disclosed in U. S. Pat. No. 2,993,437 issued July 25, 1961, to F. M. Demer et al. Element 20 represents a loop buffer storage device similar to that disclosed in U. S. Pat. No. 3,057,568 issued Oct. 9, 1962, to J.A. Weidenhammer et al. Element 25 represents an electrophotographic forms printer. Paper web 15, fed from supply roll 9 into printer 10, is printed with the variable data constituting a succession of documents, the format and data arrangement of which are individually controlled by the computer program and data storage just as if the web had been preprinted with form backgrounds, which it is not. Additionally, the printer prints a line of control symbols at the beginning of each document, these symbols controlling the subsequent operation of the forms printer 25. The web 15, containing the variable data entries in the required format arrangement and the control symbols printed in a fixed relativity with respect to each separate document format, issues from the printer 10 under the paper feed control of the automatic carriage which is included as a part of printer 10. The web 15 feeds into the loop buffer storage device 20 to form a loop under the influence of the difference in pressure caused by evacuating the bottom of the loop chamber. The loop length is sensed by vacuum switches ULS (upper limit switch) and LLS (lower limit switch) to provide electrical signals respectively when the loop is too short or too long. If the loop becomes too long, switch LLS is actuated to interrupt printer 10 until the forms printer 25 can absorb the excess slack. Switch LLS operates the normal stop circuits of printer 10. If forms printer 25 exceeds the output of printer 10, to operate switch ULS, its closure interrupts the operation of the forms printer in a manner to be described. Normally, the two printers, while operating asynchronously, operate at substantially the same average speed so that the loop in web 15 floats between these limits and absorbs the differences between the intermittent and variable speed of delivery from printer 10 and the constant feed of forms printer 25.

The web 15 is fed from the loop storage device by pinch rolls 26 and 27 which are part of the forms printer 25, after passing over suitable guide rollers 21 and 22. From there it reverses direction by being led over roller 29 so as to face the printing outward on drum 31 when the documents are fed thereon, the web 15 having printing on its top surface as it issues from printer 10. The web 15 after reversing direction around roll 29 is fed by pinch rolls 33 and 34 past photocell PC1 which senses one of the control symbols preprinted on the web 15 to actuate the one revolution clutch 35 to engage the rotary shear 36 (or a flying shear) to cut the web 15 into separate documents, each containing its associated control symbols. The severed documents are fed by paired rollers 37, and 39 into the bite of roller 41 and drum 31. Drum 31 has gated suction ports opening from the drum interior to hold the severed documents in close wrap around the drum. Rotation of the document, with its print facing out, feeds the control symbols past a sensing station containing photocells PC2 through PC7, which sense the control symbols, and through control circuits 43 operate the projectors P1 and P2 in alternate succession to index a strip film therein to the proper frame containing the requisite image of the forms background to be overprinted on the document around the previously printed variable data. When the control symbols reach photocell PC8, it operates the indexed projector to project its image on the xerographic drum 45. When the leading edge of the document enters the bite of drums 31 and 45, it is printed from drum 45 by the conventional xerographic process. The thus overprinted document is stripped from the drum 31 by internally gated air jets and guide fingers 46 to be fed by paired pinch rolls 47 to and through the toner fixer 48, which by a combination of heat and pressure fixes the toner to the paper. Paired rollers 49 and 50 feed the document to deflector 51 and stacker 52. This completes the feed of the web and severed documents through the forms printer 25 where they have received an overprint of the requisite form background in registration with the variable data printed by printer 10.

Before proceeding with a more detailed examination of the forms printer 25 and the design thereof, it is necessary to digress briefly and examine some features of the printer 10 and the printing it effects, as related to the operation of the overall device. Printer 10 is capable of printing any symbol from the font of symbols available in the machine in any column, and on any line of either blank or preprinted stationery, all under control of the program and data in a computer connected to the printer. A printer of this nature, conventionally has a capacity of 132 columns and can print at a rate in excess of 1,000 lines of print per minute with a one-sixth inch spacing between the lines. Were the printer 10 printing upon every line, its yeild in feed per minute of web would be limited. However, it is a rare business instrument that has printing on every line, and the printer 10 has a paper feed carriage that skips at high speed over unprinted lines on the forms. Thus, its average speed is very much greater than its line spacing print speed might indicate. The constant speed of forms printer 25 is adjusted to equal the average web speed of printer 10, based on operating experience from a typical succession of documents. The loop storage device 20 absorbs the short term differences.

Figure 2:
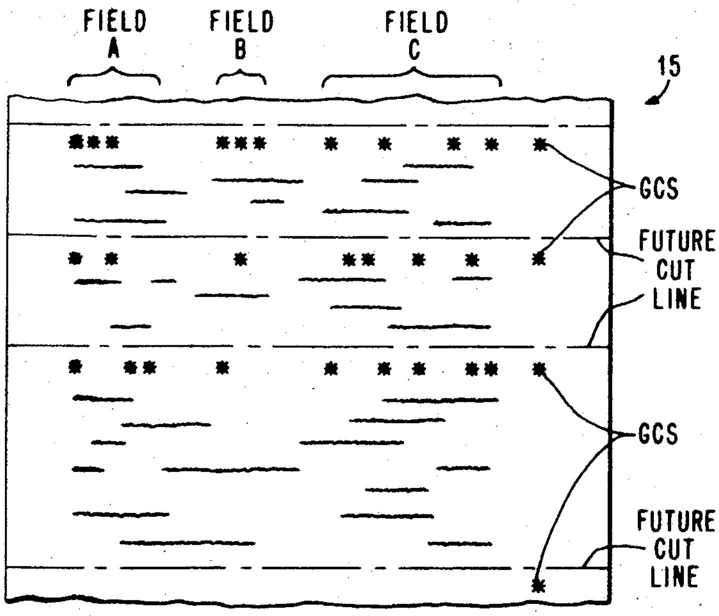
FIG. 2 is a drawing of a typical succession of documents as produced by the variable data printer.

Turning now to FIG. 2 which shows the web 15 as it might issue from the printer 10, the gating control symbol GCS (illustratively an asterisk, although any symbol may be used) is the only printing that is effected in the last column of the form. This gates the remaining control symbols appearing on the same line to be sensed, and ignores any other symbols constituting the data. The remaining control symbols appearing on the same line as the symbol GCS are conveniently divided into fields, much as one divides a punched card into fields, each with a different significance. Because of the tremendous bit capacity in 131 recording positions the control fields may be widely separated to permit the use of segmented pinch rolls with the photosensing elements disposed in the space between the segmented rollers. Typically, field A, with five binary recording positions, would be allocated for forms selection, giving a capability of selecting from a library of 32 form backgrounds. Field B, containing three recording positions, controls the number of copies to be made from the original. Field C (and any others deemed necessary) receive special computer controlled combinations of asterisks to control subsequent document distribution, for example. For control of the forms printer 25, only the gating symbols GCS symbol field A are necessary, and they are printed at the top of each new document. Alternatively, the symbols may be printed serially in the last column. If the forms printer 25 is disconnected from printer 10 and operated alone, the control symbols will preferably follow the associated document, because the web would in this instance be rolled and fed backwards. The computer which controls the printer 10 is programmed to print the control symbols in positions compatible with the document format and with the subsequent sensing elements. The successive joined documents are of variable length and each is headed by a line of control symbols.

Figure 3:
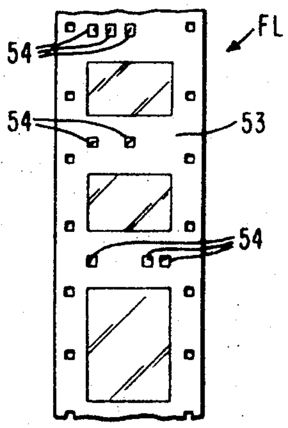
FIG. 3 is a drawing of a section of the film loop containing the stored library of background forms.

Each of the projectors P1 and P2 (FIG. 1) contains a complete library of stored images for all 32 of the forms background, together with binary coded marks between film frames to identify the associated image. It also contains a blank-frame for a purpose to be described. These are stored on continuous loops FL of sprocketed film, a typical section of which appears as in FIG. 3. It is noted that a gating mark corresponding to the symbol GCS on web 15 is not needed, because the form background images will not interfere with the indexing marks. Specifically, the film space 53 between frames is opaque, except for transversely recorded codal marks 54. These marks are sensed by photocells in the projectors and control the high speed indexing thereof until the code marks match the control symbols printed in field A of the document. The code marks 54 are placed a fixed distance from the leading edge of the corresponding frame containing the form background image. This distance equals the distance between the photocells and the frame exposure slit in the projectors P1 and P2. Since the film is projected onto an arcuate surface (drum 45, FIG. 1), it is moved past the exposure slit in timed synchronism with the drum movement during exposure of the drum. Thus successive incremental line images are formed on the drum to produce the composite image thereon.

It was stated that forms printer 25 may be stopped if the web loop is too short. Since this signal may occur at any time, it is necessary to continue the exposure and printing of any document already in process. This is why the shear 36 is provided, so that when a stop signal arrives, the cut document may proceed through the feed beyond the shear. However, the web feed cannot be stopped at just any position, but must be stopped immediately following a shearing operation. To this end the one revolution clutch 35 which conventionally is provided with a detent pawl that falls into a notch in the driven member upon completion of one revolution is further provided with a pair of electrical contacts CDS which are closed when the detent pawl falls into the notch. Thus a stop signal originating in switch ULS and carried by line 23 will, by circuits to be explained when the wiring diagram is described, operate clutch 58 upon the next opening and reclosure of the contacts connected to the one revolution clutch 35. This insures that document feed beyond the shear 36 may continue with a stopped web feed.

The shear 36 is tripped by photocell PG1 when it senses the gate control symbol GCS, and moves synchronously with the web feed so as to cut the web just in advance of the line of control symbols, leaving them attached to their corresponding following document. The distance separating the photocell PC1 and the active shear line of shear 36 must be smaller than the minimum length of documents to be processed, because the shear can only respond to one cut signal during its shear cycle.

The clutch 58 provides the requisite interruption of the web feed and receives its drive from the main machine drive to operate all web drive elements at the same lineal speed employed throughout the machine. Since clutch 58 intercepts the web feed only, it connectively drives only the rollers 26, 27, 29, 33, and 34 and the input shaft to the one revolution clutch 35. All other feed rolls, and drums 31 and 45 rotate continuously with the same surface speed as do the clutched web feed rolls.

While the xerographic printing process is well known in the art, certain aspects thereof, particularly the operation thereof with respect to the document feed require examination. Normally, absent any stop control on line 23, the documents are fed on drum 31 just as if they had not been severed. The group of photocells PC2 to PC7 sense the gating symbol GCS and the film frame selection marks in field A and control the indexing of either the projector P1 or P2, which indexing must be complete by the time that the indexing marks reaching the photocell PC8, the arcuate distance between the two sensing stations being less than the minimum document length. When photocell PC8 senses the gating mark GCS, it opens the shutter on the appropriate one of the projectors P1 or P2 and clutches the basic machine drive to the camera film drive to move the film at a scale speed (inversely proportional to the magnification of the projection lens) past a projection slit. This insures that the film will traverse the slit in the same time that the document will pass a given point as it rotates on the drum 31. If it is assumed that the exposure station and printing station on the xerographic drum 45 are diametrically opposed, then the drum 31 is proportioned to the size of the drum 45 so that the arcuate distance from PC8 to the printing station is equal to half the circumference of drum 45. Typically, if the angle $\alpha$ is 120°, drum 31 will be 1½ times as large as drum 45.

Projector P1 and P2 are identical, and project their images alternately through mirrors M1 and M2 to the projection station, by means of solenoid controlled shutters and alternately clutched drives to the drum 45 drive. Thus, as any given portion of the document moves through the angle $\alpha$, the corresponding image of the form background will move from the exposure station through the inking station 59 to the printing station. The xerographic process includes the conventional cleaning station 60, ion charging station 61, exposure station, toning station 59, printing station and toner fixing station 48, where heat and pressure are applied to the inked document to fix the ink to the document. When the web is interrupted so as to feed no document to drum 31, the next scheduled one of the projectors P1 or P2 is indexed to a blank frame on the film strips by the film indexing mechanism and thus exposes the drum 45 to continuous light to erase the charge thereon and prevent inking thereof. This obviates the fouling drum 31 in the absence of a document, particularly since drum 31 is a vacuum drum.

Drum 31 is provided with an internal vacuum chamber 38 extending the length of the drum and arcuately from the bite of drum with roller 45 to just short of the delivery fingers 46. The drum 31 is porous to provide the requisite adherance of the document to the drum. At the delivery station an internal tuyere 40 directs a blast of air through drum 45 to blow the leading edge of the document off the drum beneath the deflecting fingers 46 to remove the document from the drum.

Figure 4:
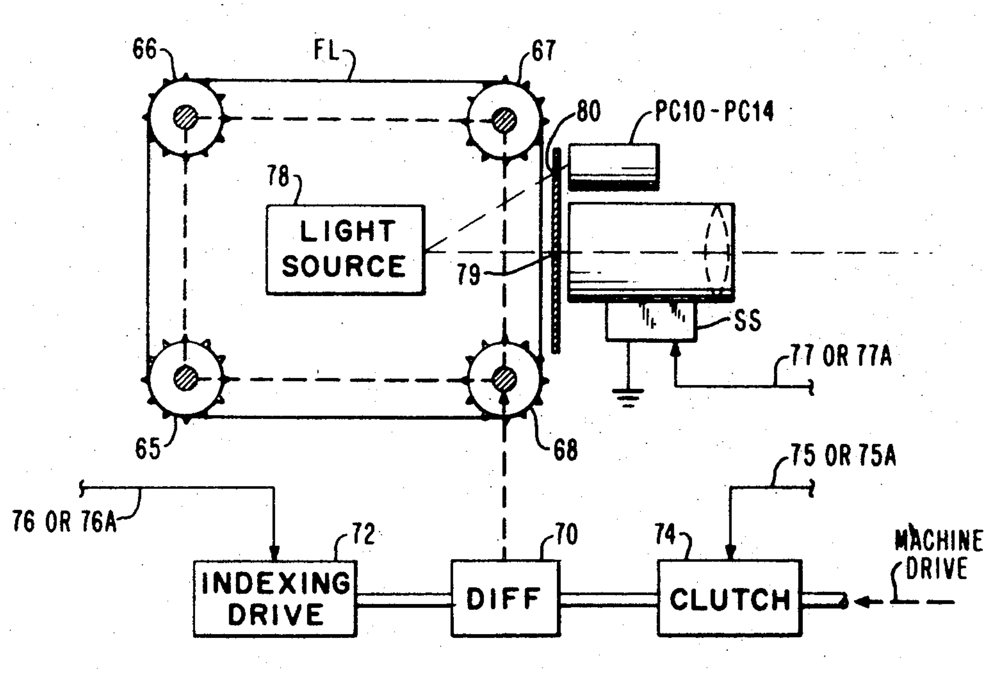
FIG. 4 is a schematic mechanical drawing of one of the duplicate projectors for projecting the forms background.

The projectors P1 and P2 are identical and similar in nature to that described in U. S. Pat. No. 2,783,454 issued February 26, 1957, to D. O. North with some important exceptions. Referring to FIG. 4 which represents schematically the arrangement necessary to implement the requisite functions, the film loop FL is guided over sprockets 65, 66, 67, and 68 all of which are driven from differential 70 which receives drive inputs from either the film indexing drive 72 or clutch 74, which clutch receives its drive from the basic machine drive, when energized by potentializing line 75 (or 75A) from control circuit 43. A further line 77 (or 77A), operates the shutter solenoid SS, to project the film image. When the film is indexing, clutch 74 is disengaged and its output shaft braked, and the indexing drive 72 (energized by a potential on line 76 or 76A) drives the sprockets 65 to 68 and film loop FL at rapid speed through differential 70 until the photocells PC10 to PC14 sense a match between the film index marks and the document form control marks. The indexing drive 72 then stops and brakes its output shaft to lock the film loop in exposure start position. When the exposure start signal arrives on lines 75 and 77, shutter solenoid SS operates to open the shutter to expose the drum, and clutch 74 engages to drive the film loop FL at scale speed. The light source 78 includes the conventional projection lamp and condenser lens standard in any film projector. It illuminates the film both at the projection slit 79 and the indexing slit 80, these slits being spaced apart a distance equal to the distance between the indexing marks 54 (FIG. 3) and the leading edge of the next following film frame.

Figure 5:
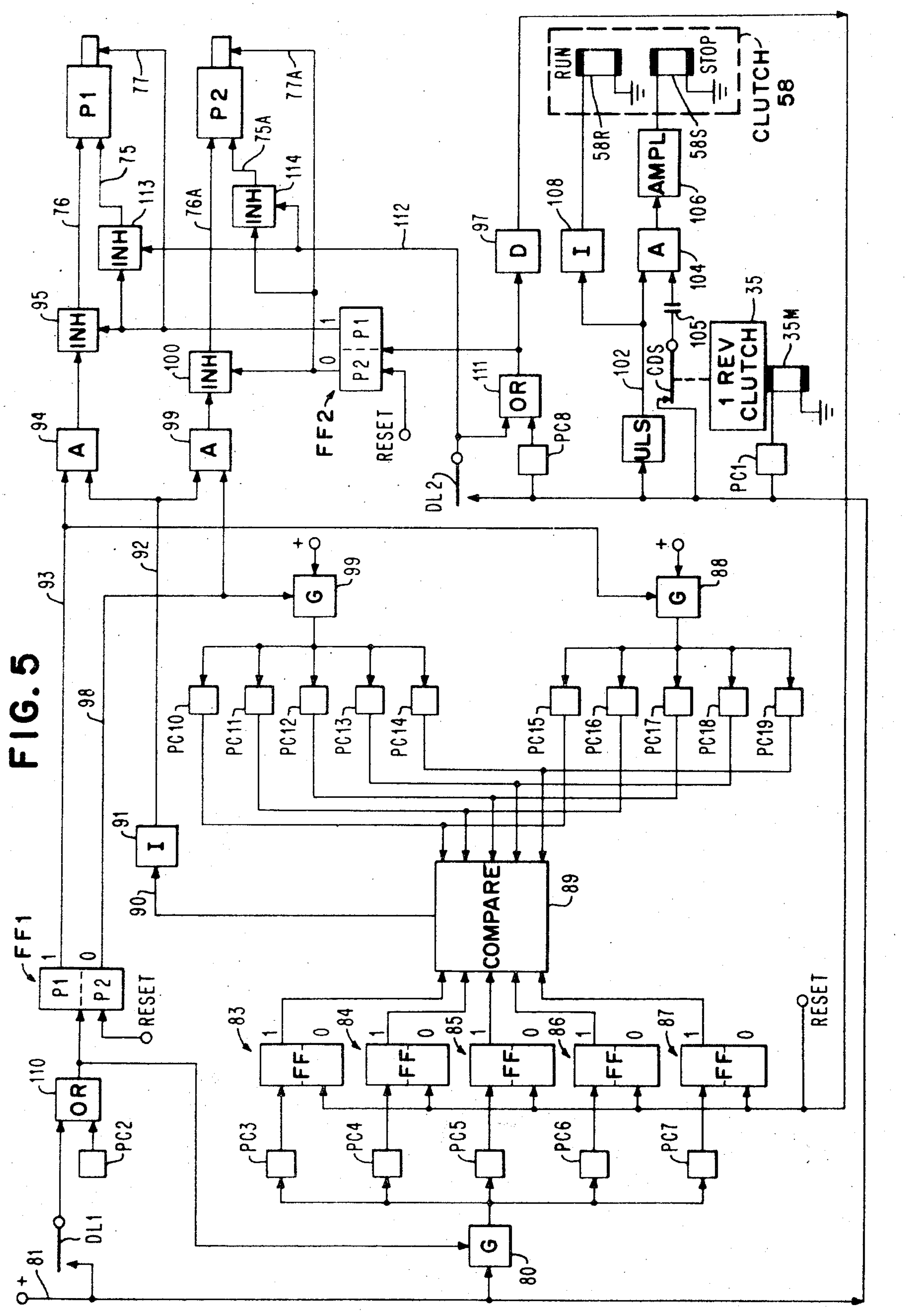
FIG. 5 is a wiring diagram of the elements necessary to control the coordinated operation of the mechanism illustrated in FIGS. 1 and 4.

In FIG. 5 the circuits for controlling the coordinated operations of the various machine elements are shown. Proceeding in the sequence of events for a succession of typical documents, and with reference to the timing diagram of FIG. 6, the first element to operate is PC1 which senses the gating symbol GCS in the last column of web 15. Operation of PC1 pulses the one revolution clutch magnet 35M to engage clutch 35 and operate shear 36 to cut the web 15 into individual documents. It performs no other function. When a document is thus sheared and fed to drum 31, photocell PC2 senses the gating symbol GCS while photocells PC3 through PC7 sense the control symbols in field A of the document. Photocell PC2 opens gate 80 (through OR110) to apply potential from line 81 to photocells PC3 to PC7 so that they are active to sense only the control symbols. PC2 also complements the trigger FF1 (initially reset to status P2). The photocells PC3 to PC7 selectively store the codal marks in field A in latches 83 to 87, these latches being initially reset upon start of operation of the machine. With FF1 in the P1 position (projector P1 active) gate 88 will be opened to apply potential to the projector indexing photocells PC15 through PC19, in projector P1. Since the film loop FL is now mis-indexed, comparator 89 yields no output signal on line 90, the absence of which signal is inverted in inverter 91 to energize line 92 and, together with the potential on line 93 energizes AND gate 94 to place a potential on line 76, since inhibit gate 95 is now inactive. Projector P1 indexes until the photocells PC15 to PC19 compare with the status of latches 83 to 87 when comparator 89 produces an output to depotentialize line 92 (and line 76) to stop the indexing. With indexing complete, the document proceeds to photocell PC8 which senses the control symbol GCS to reset latches 83 to 87 (through OR gate 111) after a slight delay (through delay 97), and complements FF2 (reset to the P2 position) to occupy the P1 status. The setting of FF2 to the P1 status energizes line 75 (through inhibit gate 113) to engate the exposure clutch 74 (FIG. 4) and line 77 to energize solenoid (FIG. 4) to expose the drum. It also inhibits (through inhibit gate 95) any indexing signal from appearing on line 76, which would occur as soon as the film strip moves out of registration with its sensing photocells. The exposure from P1 continues until the photocell PC8 senses the next following document (the end of the preceding document) to switch FF2 to the P2 position to remove potential from lines 75 and 77. The significance of this relationship will be appreciated if one remembers that the severed documents are spaced on the drum 31, just as if they were joined.

When the second document reaches photocells PC2 through PC7 (while P1 is still exposing the drum 45) FF1 will switch to the P2 position to potentialize line 98 and open gate 99 to activate the photocells PC10 through PC14 in projector P2. Projector P2 now miscompares and line 92 and line 98 combine in AND gate 99 to produce an output passed by inhibit gate 100 to indexing line 76A of projector P2. When photocell PC8 senses the end of the second document, it switches FF2 to the P2 position to expose projector P2 by activating line 75A (through inhibit gate 114) and line 77A. Switching of FF2 from P1 position to P2 position closes the shutter of projector P1, unclutches its exposure drive, and renders it operable to index when next PC2 senses a new GCS symbol.

When the upper limit switch ULS closes, indicating a short loop, the positive potential on line 81 appears on line 102 as a half input to AND gate 104. Because the other input is coupled through capacitor 105 (a differentiator), AND gate 104 will not operate, even if the contacts CDS are closed. When, however, the one revolution clutch 35 is next operated to open and reclose the clutch detent switch CDS, the reclosure of this switch will couple the positive potential through capacitor 105 to operate AND 104 which through amplifier 106 actuates the stop magnet 58S of the clutch 58 at the end of the shearing operation and before the leading edge of the web reaches the bite of the constantly running feed roll pair 37. When the loop length is restored and ULS opens, inverter 108 produces a potential to activate the magnet 58R to reconnect the drive through clutch 58.

During the period when web feed is interrupted and no documents are fed to drum 31, it is desirable to prevent toner from being applied to drum 45, lest it foul the drum 31. Obviously a separate light source could be focused on the drum during this interval. However, these are perfectly usable light sources in the two projectors which may be exploited for this purpose. To this end, two document sensing levers DL1 and DL2 are placed in contact with drum 31 at the respective angular positions occupied by PC2 and PC8. These sensing levers (like card feed levers in a tabulating card feed) close contacts in the absence of a document on drum 31. Thus, when the trailing edge of the last document the indexed be fed following a web feed interruption passes lever DL1, it closes and produces an impulse just as if PC2 had sensed the next following document. This impulse switches FF1 to the next projector position and opens gate 80 (both through OR110) to activate photocells PC3 through PC7. These photocells now sense an uncovered drum 31 which is nonreflective so as to simulate a full field A of asterisks. This code indexes the appropriate projector to a blank film frame. When the document end passes document lever DL2, it simulates the action of PC8 and starts the exposure from theindexed projector through OR111 just as if PC8 had supplied the pulse. The opening of the shutter on the appropriate projector occurs through line 77 (or 77A) from trigger FF2 in the normal manner. Now, however, it is unnecessary, and in fact undesirable, to move the film during exposure of the erasing frame. Consequently, closure of contacts DL2 through line 112 operates inhibitors 113 and 114 to prevent energization of lines 75 and 75A and prevent energization of the film drive clutches. Thus, the film remains with a blank film strip in the operating projector and erases the charge on drum 45 for the duration of the closure of contacts DL2.

When web feed is restored and contacts DL1 open, signalling the entrance of a new leading edge of a document, photocells PC2 to PC7 operate in their normal fashion to switch projector indexing to that projector which was inactive during the erasing operation. When the second document contacts open (slightly in advance of the control symbols) photocell PC8 resumes its normal function of exposing from the newly indexed film strip. Thus, the absence of a document on drum 31 indexes and exposes a blank film strip, just as if a document were present, the document levers DL1 and DL2 substituting for the photocells PC2 and PC8 to sense the absence of a document. This erasing continues until a newly fed document appears on drum 31.

Figure 6:
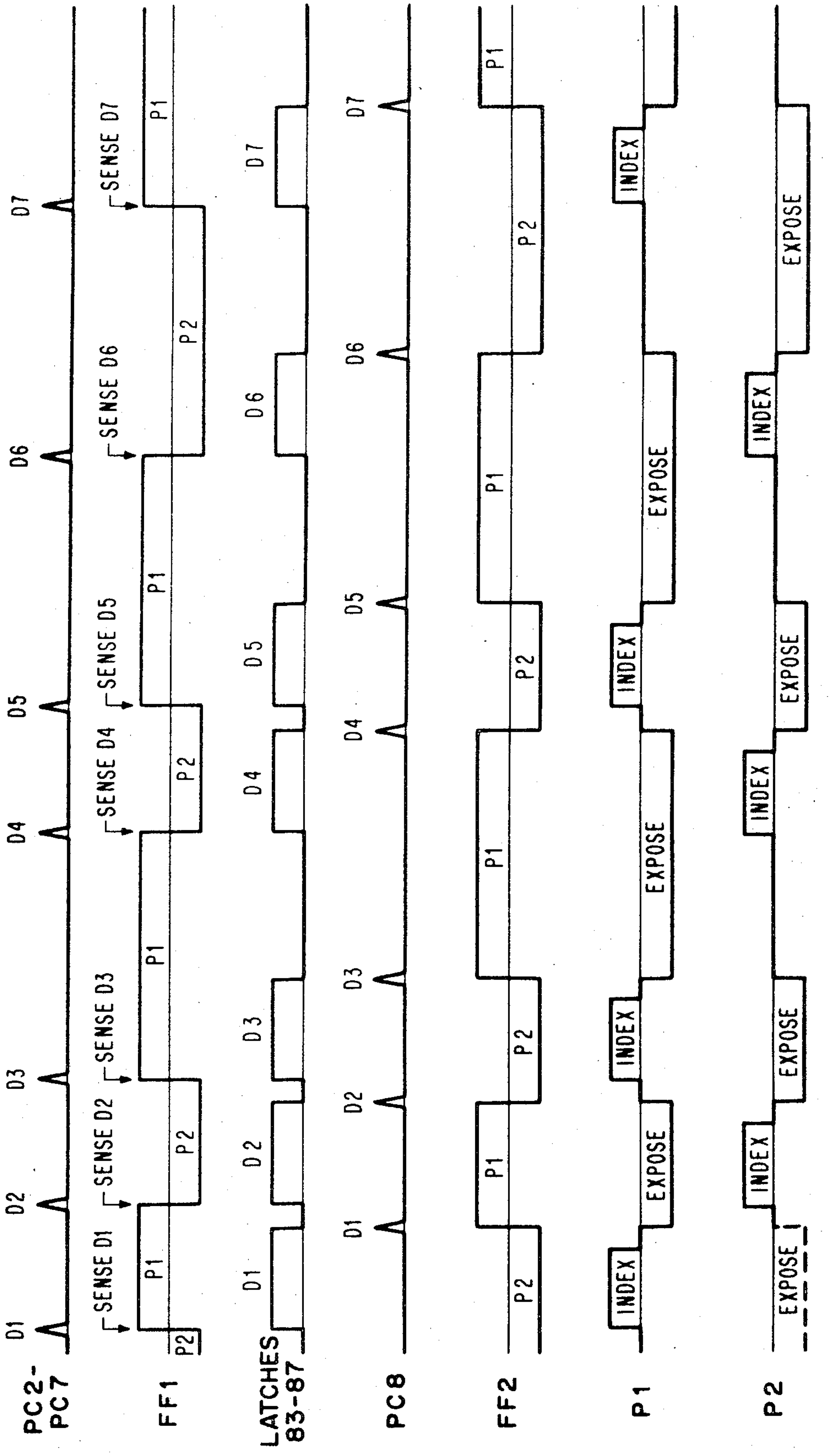
FIG. 6 is a timing diagram of a typical operation of the machine.

Referring now to FIG. 6 which shows the relative timing and alternate operation of projectors P1 and P2 and their overlapping operation a typical sequence starts at the left of the drawing with the FF1 reset to P2 and FF2 also reset to P2. When PC2 senses document D1 and PC2 switches FF1 from P2 to P1, the latches 83–87 store the code of document D1 until PC8 senses document D1 at D1 time to reset these latches and switch FF2 from P2 to P1 to start the exposure. Projector P1 indexes when PC2 is energized at D1 and completes its operation before PC8 senses D1. Each new document will successively pass PC2 and PC8 with a fixed delay sufficient to allow film indexing and will cause the alternate indexing and exposure of P1 and P2. Since the documents appear on the drum 31 as if they were joined, the exposure from one projector follows immediately the exposure from the other projector. This relationship is shown by the disposition of the marks labelled "expose" on the timing chart, and coincides with the status of FF2. The indexing is controlled by FF1 and by the comparing of film marks with the status of latches 83–87, indexing being complete before PC8 resets the latches in preparation for the next document.

Extrapolation of the events for documents D1 and D2 will reveal that the odd documents operate projector P1 and the even documents operate projector P2. The document length controls the exposure time, which is proportional to the document length. The transit time of the document from PC2 to PC8 is constant and independent of document length. Thus, the PC2 impulse for D1 is spaced apart the same distance from the PC8 impulse for D1 as is the PC2 for D3 from PC8 for D3. The DL1 and DL2 contacts would close at the same times as PC2 and PC8 respectively, and reopen shortly before the next PC2 and PC8 impulses are sensed because the control symbols are printed slightly below the shear line (future cut line) on the document as shown in FIG. 2.

It will readily be appreciated that once the basic concept of preparing a document by a two step operation has been taught other specific means for implementing this function would naturally occur to one skilled in the art. For example, instead of printing the control symbols on the stationery itself, these same symbols could be recorded in a paper tape simultaneously with the printing of the forms and under control of the printer. This tape when fed synchronously with the document web in the forms printer 25 would then substitute its control for that of the preprinted control symbols. This form of control, however, offers no particular advantage over the embodiment illustrated since the printer is capable of producing the control symbols as an ancillary function to the document preparation without any sacrifice.

While the invention has been particularly shown and described with reference to a preferred embodiment thereof, it will be understood by those skilled in the art that various changes in form and details may be made therein without departing from the spirit and scope of the invention.

What is claimed is:

1. The method of preparing a succession of documents, containing randomly different form background data content and variable data content including selection of appropriate background data for variable data to provide the desired documents, comprising the steps of:

a. printing the variable data in the required format for each successive document on blank stationery in a record controlled printer, together with sets of coded symbols individual to each document for identifying a corresponding background data instrumentality including the corresponding background data;

b. successively reading each of the sets of control symbols and in response to each set of control symbols selecting a form background data instrumentality corresponding to each set of symbols, c. and employing each selected background data instrumentality for overprinting the corresponding background data with the variable data constituting each document from the thus selected corresponding background data instruementality.

2. The method of claim 1 wherein the forms overprinting is effected by the electrophotographic process.

3. The method of preparing a succession of documents containing variable data content and randomly different background data content, including selection of appropriate background data for each document, to provide the desired composite documents, comprising the steps of:

a. printing on stationery for each successive document the variable data in the required format together with control symbols coded individually to each document for identifying background data instrumentalities which contain desired background data for said successive documents;

b. successively machine reading said control symbols from successive documents and, in response to the reading of said control symbols, selecting for each document a background data instrumentality corresponding to said read control symbols, and c. employing the background data instrumentality selected for each document for printing the corresponding background data over the variable data.

* * * * *